United States Patent
King et al.

(10) Patent No.: US 6,711,481 B1
(45) Date of Patent: Mar. 23, 2004

(54) SYSTEM AND METHOD FOR PROGRAMMING AN EXIT DELAY FOR AUTOMATIC HEADLAMPS

(75) Inventors: Daniel M. King, Northville, MI (US); Ronald P. Brombach, Plymouth Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 09/641,657

(22) Filed: Aug. 18, 2000

(51) Int. Cl.[7] .................. G02F 1/17; H05B 37/02; B60Q 1/76
(52) U.S. Cl. .............. 701/36; 315/82; 340/430
(58) Field of Search .................. 701/36; 315/77, 315/82, 83, 159; 340/430, 425.5, 457.2

(56) References Cited

U.S. PATENT DOCUMENTS

| | | | | |
|---|---|---|---|---|
| 3,628,085 A | | 12/1971 | Brock | 315/62 |
| 3,723,807 A | * | 3/1973 | Tozzi | 315/83 |
| 3,810,089 A | * | 5/1974 | Florence et al. | 340/52 D |
| 4,220,947 A | * | 9/1980 | Yamamoto | 340/63 |
| 4,342,946 A | | 8/1982 | Valenzona et al. | 315/82 |
| 4,965,461 A | | 10/1990 | McRoberts, Jr. | 307/10.8 |
| 5,451,822 A | * | 9/1995 | Bechtel et al. | 307/9.1 |
| 5,592,146 A | | 1/1997 | Kover, Jr. | 340/468 |
| 5,666,028 A | * | 9/1997 | Bechtel et al. | 315/82 |
| 5,998,929 A | * | 12/1999 | Bechtel et al. | 315/82 |
| 6,005,348 A | * | 12/1999 | Kambara et al. | 315/82 |
| 6,014,207 A | * | 1/2000 | Suzuki et al. | 356/229 |

* cited by examiner

*Primary Examiner*—Tan Q. Nguyen
*Assistant Examiner*—Dalena Tran

(57) ABSTRACT

A system 10 for controlling automatic headlamps within a vehicle which allows an operator of a vehicle to selectively program the amount of time that the exterior headlamps of the vehicle remain illuminated after the vehicle's ignition switch 18 is turned to the "OFF" position or the "exit delay" of the system 10. System 10 utilizes a controller 22 to monitor the positions of ignition switch 18 and headlamp switch 16. If the positions of switches 16 and 18 match a certain sequence within a predetermined period of time, system 10 initiates an "exit delay" programming period which is selectively terminated by a user. Controller 22 uses the programming period as the new "exit delay" for the system.

20 Claims, 2 Drawing Sheets

SYSTEM AND METHOD FOR PROGRAMMING AN EXIT DELAY FOR AUTOMATIC HEADLAMPS

(1) FIELD OF THE INVENTION

This invention relates to a system and a method for programming an exit delay for automatic headlamps within a vehicle and more particularly, to a system and a method for programming automatic headlamps within a vehicle which allows an operator of a vehicle to selectively program the amount of time that the exterior headlamps of the vehicle remain illuminated after the vehicle's ignition is switched to the "OFF" position.

(2) BACKGROUND OF THE INVENTION

Automatic headlamp systems are commonly used within automotive vehicles to automatically control the function of the vehicle's headlamps based upon the operating state of the vehicle and the ambient light level outside of the vehicle.

These automatic headlamp systems often include an "exit delay" feature which maintains the vehicle's headlamps in an illuminated state for a period of time after the vehicle has stopped (i.e., after the vehicle's ignition switch has been turned to the "OFF" position). This feature allows an operator of the vehicle to illuminate areas around the vehicle after the operator has turned the vehicle off, thereby increasing the operator's awareness of his/her surroundings when he/she exits the vehicle in the dark or at night. In some systems, this "exit delay" is a fixed period of time which is not controllable by the operator. These types of systems are undesirable, as the amount of "exit delay" time needed and/or desired may vary from operator to operator. Particularly, certain operators may need additional time to exit the vehicle or may desire a longer period of illumination once they have exited the vehicle. Other systems have utilized an additional "exit delay" switch which allows a user to select between a finite number of fixed exit delay times. These systems also have drawbacks. Namely, the finite number of "exit delay" times may not suit the needs or desires of every operator. Moreover, these systems further utilize an extra multi-position switch which increases the cost and complexity of the system and the vehicle.

The present invention addresses these drawbacks and provides a system and a method for programming the automatic headlamps of a vehicle which allows an operator to select the amount of time that the headlamps remain illuminated after the vehicle has been turned off.

SUMMARY OF THE INVENTION

It is a first object of the invention to provide a system and a method for controlling the automatic headlamps of a vehicle which overcomes at least some of the previously delineated drawbacks of the prior systems, devices, and/or methods.

It is a second object of the invention to provide a system and a method for controlling the automatic headlamps of a vehicle which allow an operator of a vehicle to selectively program the amount of time that the exterior headlamps of the vehicle remain illuminated after the vehicle's ignition is switched to the "OFF" position.

It is a third object of the invention to provide a system and a method for selectively controlling automatic headlamps which allows a user to program the "exit delay" without the use of an extra switch.

According to one aspect of the present invention, an automatic headlamp system for a vehicle having an ignition switch and headlamps is provided. The system includes a headlamp switch for controlling the headlamps and having a position corresponding to an automatic headlamp mode; and a controller which is communicatively coupled to the headlamp switch and to the ignition switch, the controller being effective to allow a user to selectively program an exit delay for the automatic headlamps by use of the headlamp switch and the ignition switch.

According to a second aspect of the present invention, a method is provided for programming an exit delay for the automatic headlamps of a vehicle including an ignition switch and a headlamp switch. The method includes the steps of monitoring positions of the ignition switch and the headlamp switch; initiating an exit delay programming period if the monitored positions of the ignition switch and the headlamp switch match a certain sequence; terminating the exit delay programming period; and causing the exit delay to be equal to the exit delay programming period.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
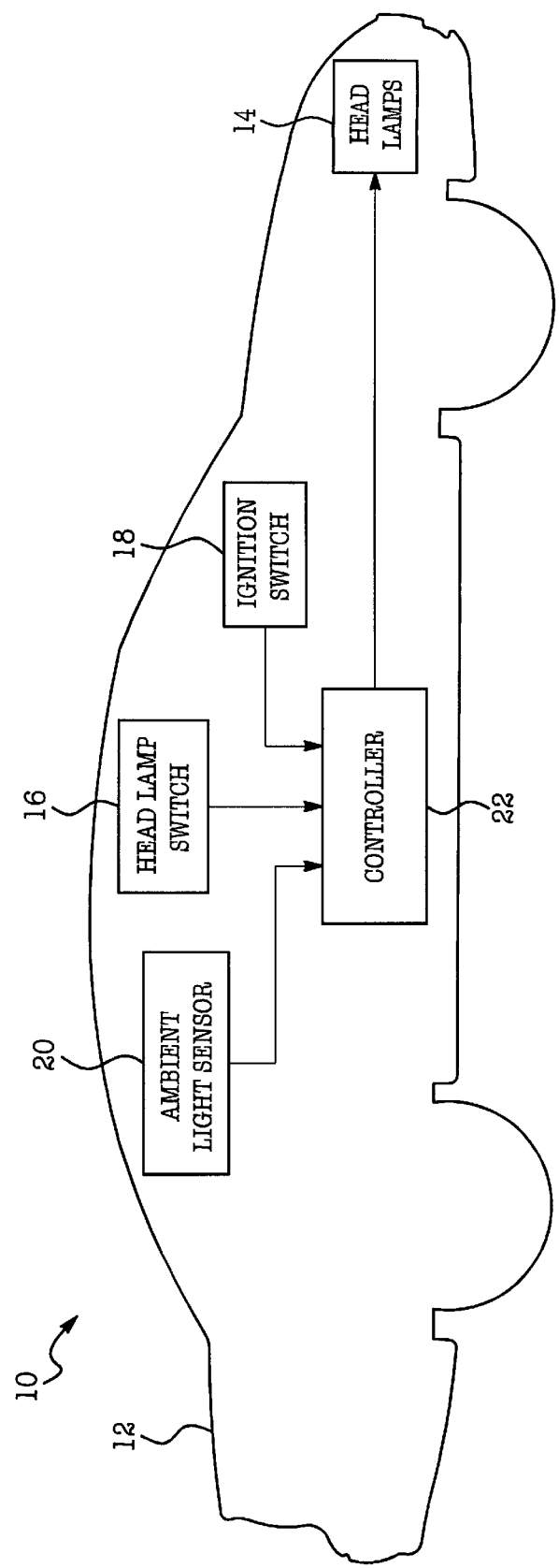
FIG. 1 is a block diagram of a system for controlling the automatic headlamps of a vehicle which incorporates the teachings of the preferred embodiment.

Referring now to FIG. 1, there is shown a system 10 for controlling the automatic headlamps 14 of a vehicle 12, which is made in accordance with the teachings of the preferred embodiment of the invention. As shown, system 10 includes headlamps 14, a user operated headlamp switch 16, an ignition switch 18, an ambient light sensor 20, and a controller 22. Headlamps 14, user operated headlamp switch 16, ignition switch 18, and ambient light sensor 20 are each communicatively coupled to controller 22. As described more fully and completely below, controller 22 receives signals from switch 16 and sensor 20 and utilizes the received signals in combination with data describing the current state/position of the ignition switch 18 to selectively provide commands to headlamps 14, thereby selectively illuminating headlamps 14 (e.g., turning headlamps 14 "on" and "off").

Headlamps 14 are conventional vehicle headlamps, and for the purposes of the present discussion may include both high beam type lamps, low beam type lamps and parking lamps. In other alternate embodiments, headlamps 14 may also include other types of lamps such as fog lights, roof-mounted lights and other types of vehicle lights.

Figure 2:
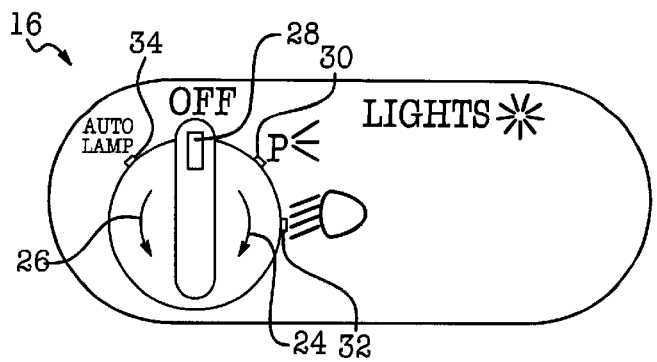
FIG. 2 is a front view of one non-limiting embodiment of a switch which is used within the system shown in FIG. 1.

In the preferred embodiment of the invention, user-operated headlamp switch 16 is a selectively rotatable "multi-position" electrical switch. One non-limiting embodiment of switch 16 is illustrated in FIG. 2 and may be operatively disposed on the dashboard or near the instrument panel of the vehicle 10. Switch 16 is selectively movable or rotatable in the clockwise direction, as illustrated by arrow 24, or in the counterclockwise direction, as illustrated by arrow 26. Switch 16 selectively generates data or command signals, which have values based upon the position of switch 16, to controller 22. In the preferred embodiment, switch 16 contains manual headlamp control positions 28–32, which include an "OFF" position, in which the headlamps 14 are not illuminated, a "PARKING LAMP" position 30, in which only the parking lamps of headlamps 14 are illuminated, and an "ON" position 32, in which both the parking lamps and the low and/or high beam lamps are illuminated. A separate switch (not shown) is operated by the driver to select between the low and/or high beam lamps when switch 16 is in the "ON" position 32. When switch 16 resides in the manual switch positions 28–32, the automatic headlamp function of system 10 is disabled. Switch 16 further includes "AUTOLAMP" position 34, in which the automatic headlamp function of system 10 is enabled. This automatic headlamp function is described more fully and completely below. In alternate embodiments, a separate automatic headlamp switch is provided. In such embodiments, position 34 is eliminated from switch 16 and a separate selectively depressible push-button or other two-position type switch is used to allow a user to select between manual headlamp operation and the automatic headlamp function. Switch 16 may also include a separate switch for dimming and brightening the vehicle's instrument panel.

Ignition switch 18 is a conventional selectively positionable vehicle ignition switch, having conventional "OFF", "ACCESSORY", "RUN", and "START" positions. Sensor 20 comprises one or more conventional and commercially available sensors which measure the ambient light level outside of vehicle 12 and which generate and communicate signals representing the measured ambient light level to controller 22.

Controller 22 may include one or more microprocessors or integrated circuits which execute or perform the logic control of system 10 and may include a conventional memory unit including both non-volatile or "permanent" memory and volatile or "temporary" memory, and which is adapted to and does store at least a portion of the operating software which directs the operation of controller 22. Moreover, as should also be apparent to those of ordinary skill in the art, controller 22 may actually comprise a plurality of commercially available, conventional, and disparate chips or devices, which are operatively and communicatively linked in a cooperative manner.

In operation, when switch 16 is turned to the "AUTOLAMP" position 34, it sends a signal to controller 22, effective to enable the automatic headlamp function or mode of system 10. When system 10 is operating the automatic headlamp mode, the headlamps 14 are turned "on" and "off" automatically based upon the position of ignition switch 18 and the level of ambient light outside of the vehicle, which is determined by sensor 20. Particularly, whenever the vehicle 12 is being operated (i.e., whenever ignition switch 18 is in the "RUN", "ACCESSORY", or "START" positions) and the level of ambient light measured by sensor 20 falls below a predetermined threshold level, controller 22 automatically illuminates or "turns on" headlamps 14 (i.e., the parking lamps and the high and/or low beam lamps). Controller 22 may also use additional strategies to determine the level or amount of illumination to provide to headlamps 14 (i.e., to determine whether and/or at what level the high and/or low beam lamps should be illuminated). If the level of ambient light measured by sensor 20 exceeds the predetermined threshold level while the vehicle is being operated, controller 22 automatically "turns off" headlamps 14 (i.e., the parking lamps and the high and/or low beam lamps). Controller 22 will also automatically "turn off" the headlamps 14 after a period of time once the vehicle is "turned off" (i.e., once ignition switch 18 is moved to the "OFF" position). Particularly, once the ignition switch 18 is moved to the "OFF" position, controller 22 starts an internal timer and continues to keep headlamps 14 illuminated until the timer expires. This "exit delay" period provides an operator of vehicle 12 with illumination when exiting the vehicle 12 in the dark or at night.

The present invention allows a user to specifically program this "exit delay" time to meet a user's needs, desires and/or comfort level. Particularly, a user can program system 10 to provide as long of an "exit delay" time as the user desires. Referring now to FIG. 2, there is shown a block or flow diagram 40, illustrating the "exit delay" programming functionality of the preferred embodiment of the present invention. As shown in step 42, to program the "exit delay" a user begins with the headlamp switch 16 in the AUTOLAMP position 34 and the ignition switch 18 in the OFF position. A user then turns the headlamp switch 16 to the OFF position 28, as shown in step 44. In step 46, which follows step 44, a user turns the ignition switch 18 to the RUN position. In step 48, which follows step 46, a user turns the ignition switch 18 back to the OFF position. In step 50, which follows step 48, a user then turns headlamp switch 16 to the AUTOLAMP position 34.

Figure 3:
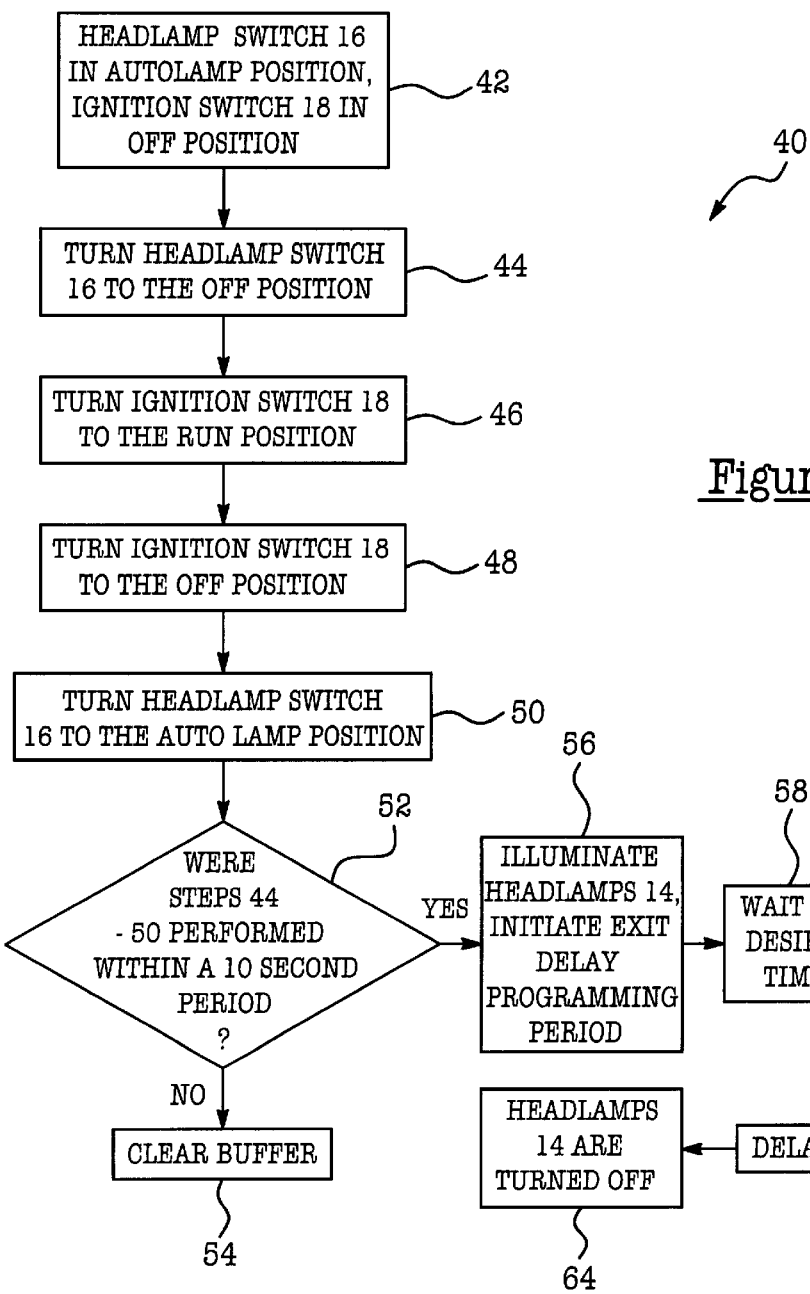
FIG. 3 is a flow chart illustrating the exit delay programming sequence used within the system shown in FIG. 1.

Controller 22 continuously monitors the positions of switches 16 and 18 and maintains a historical index or record of the positions of switches 16, 18 within a memory buffer. In the preferred embodiment of the invention, controller 22 starts an internal timer upon detecting the occurrence of steps 42, 44 (i.e., the ignition switch 18 is in the OFF position and the headlamp switch 16 moves from the AUTOLAMP position to the OFF position). In the preferred embodiment, the timer is set to approximately ten seconds. In step 52, controller 22 reads the buffer at the end of the ten second period to determine whether the positions represented by steps 44–50 are stored within the buffer in the proper sequence. If steps 44–50 were not completed within the ten second period, controller 22 proceeds to step 54, and clears the buffer. If the steps 44–50 were completed in the correct sequence (i.e., the sequence shown in FIG. 3) and within the ten second period, then the buffer contains the correct data and controller 22 proceeds from step 52 to step 56.

In step 56, controller 22 causes the headlamps 14 to be illuminated, thereby notifying the driver that the "exit delay" programming period has been initiated. A user then waits for a period of time which will become the new "exit delay", as shown in step 58. Particularly, controller 22 monitors this "wait time" or programming period and subsequently uses this period as the new "exit delay". In step 60, once the user has waited for the desired period of time, the user turns the headlamp switch 16 to the "OFF" position. In step 62, once the user has turned switch 16 to the "OFF" position, the programming period is terminated, and controller 22 saves the monitored "wait time" or programming period as the new "exit delay" time. In step 64, the controller 22 turns off the headlamps 14, thereby notifying the user that the "exit delay" programming sequence is completed.

It should be appreciated that the present invention allows a user to selectively program the "exit delay" for the automatic headlamps feature to be equal to any amount of time the user desires. The present invention provides a user with a near endless variety of options for the "exit delay", thereby meeting the desires, needs and/or comfort level of any user. Moreover, the present invention provides all of these benefits without requiring a separate exit delay switch. The elimination of this component reduces the complexity and cost of the vehicle.

It should be understood that Applicant's invention is not limited to the exact programming sequence 40 which has been described herein, but that various changes and/or modifications may be made without departing from the spirit and/or the scope of Applicant's invention. For example, and without limitation, method 40 may include different or additional steps and may perform the disclosed steps and/or other steps in a different order or manner.

It is understood that the various inventions are not limited to the exact construction illustrated and described above, but that these previously delineated inventions may be varied without departing from the scope of the inventions as described in the following claims.

What is claimed is:

1. An automatic headlamp system for a vehicle having an ignition switch and headlamps, said system comprising:
   a headlamp switch for controlling said headlamps and having a position corresponding to an automatic headlamp mode;
   a controller which is communicatively coupled to said headlamp switch and to said ignition switch, said controller being effective to allow a user to selectively program an amount of time said automatic headlamps remain on after said vehicle is shut down by use of said headlamp switch and said ignition switch in a predetermined sequence, wherein said controller which comprises a buffer for monitoring the positions of said ignition switch and said headlamp switch; and wherein said controller is effective to clear said buffer after a predetermined time period expires.

2. The system of claim 1 wherein said headlamp switch comprises a multi-position rotatable switch.

3. The system of claim 2 wherein said controller comprises a buffer for monitoring the positions of said ignition switch and said headlamp switch.

4. The system of claim 3 wherein said controller is effective to clear said buffer after a predetermined period of time expires.

5. The system of claim 4 wherein said headlamps comprise parking lamps.

6. The system of claim 5 wherein said headlamps further comprise high beam lamps.

7. The system of claim 6 wherein said headlamps further comprise low beam lamps.

8. The system of claim 7 further comprising an ambient light sensor which is communicatively coupled to said controller and which is effective to detect a level of ambient light outside of said vehicle and to generate a signal to said controller based upon said detected level of ambient light.

9. The system of claim 8 wherein said controller selectively illuminates said headlamps based upon said signal from said ambient light sensor.

10. A method for programming a length of time the automatic headlamps of a vehicle remain operating after the vehicle is shut down, wherein the vehicle includes an ignition switch and a headlamp switch, said method comprising the steps of:
    providing a controller which is coupled to said ignition switch, said automatic headlamps, and said headlamp switch;
    monitoring positions of said ignition switch and said headlamp switch;
    causing said controller to initiate an exit delay programming period if the monitored positions of said ignition switch and said headlamp switch match a certain sequence, wherein said controller measures an amount of time that said exit delay programming period lasts;
    terminating said exit delay programming period;
    causing said measured amount of time to be equal to said length of time said automatic headlamps remain operating after said vehicle is shutdown, wherein said exit delay programming period is terminated by use of said headlamp switch and wherein said exit delay programming period is initiated only if the monitored positions of said ignition switch and said headlamp switch match said certain sequence within a predetermined period of time.

11. The method of claim 10 wherein said exit delay programming period is terminated by use of said headlamp switch.

12. The method of claim 11 wherein said monitored positions of said ignition switch and said headlamp switch are held within a buffer.

13. The method of claim 11 wherein said headlamp switch comprises a selectively rotatable multi-position switch.

14. The method of claim 10 wherein said exit delay programming period is initiated only if the monitored positions of said ignition switch and said headlamp switch match said certain sequence within a predetermined period of time.

15. The method of claim 14 wherein said predetermined period of time is approximately ten seconds.

16. A method for programming a length of time automatic headlamps of a vehicle remain operating after said vehicle is shut down, said vehicle having an ignition switch, said method comprising the steps of:
    providing a headlamp switch for controlling said headlamps and having a position corresponding to an automatic headlamp mode;
    monitoring positions of said headlamp switch and said ignition switch over a predetermined period of time;
    allowing said length of time to be programmed if said monitored positions match a predetermined sequence; and
    storing the positions of the headlamp switch, ignition switch, and said length of time to be stored in a buffer.

17. The method of claim 16 wherein said headlamp switch comprises a multi-position rotatable switch.

18. The method of claim 17 wherein said predetermined period of time is ten seconds.

19. The method of claim 16 wherein said predetermined sequence includes the steps of:
    causing said headlamp switch to be in said automatic headlamp mode and said ignition switch in a off position;
    switching said headlamp switch to an off position;
    switching said ignition switch to a run position and then back to said off position; and
    switching said headlamp switch back to said automatic headlamp mode.

20. The method of claim 16 wherein said predetermined sequence must be performed within said predetermined time before allowing said length of time to be programmed.

* * * * *